United States Patent Office 3,758,421
Patented Sept. 11, 1973

3,758,421
EMULSIFYING CURING AGENTS FOR WATER DILUTABLE EPOXY RESIN SYSTEMS
Otho Leroy Nikles, Jr., Toms River, N.J., assignor to Resyn Corporation, Linden, N.J.
No Drawing. Continuation-in-part of application Ser. No. 873,501, Nov. 3, 1969. This application July 7, 1970, Ser. No. 53,010
Int. Cl. C08g 30/14
U.S. Cl. 260—2 N                      8 Claims

ABSTRACT OF THE DISCLOSURE

This invention relates to emulsifying curing agents for preparing water dilutable epoxy resin systems and to the preparation of these products and their use with epoxy resins. The novel curing agents are represented by the following formula

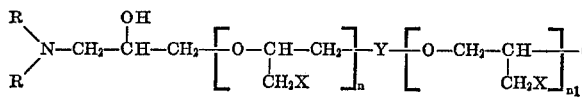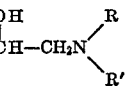

BACKGROUND OF THE INVENTION

This application is a continuation-in-part of copending U.S. patent application S.N. 873,501, filed Nov. 3, 1969, and now abandoned.

(1) Field of the invention

This invention relates to emulsifying curing agents for preparing water dilutable epoxy resin systems. More particularly this invention relates to the reaction products of diamines with the diglycidyl ethers of polyglycols, the preparation of these products and their use with epoxy resins to form water dilutable or water soluble epoxy resin systems.

(2) Description of the prior art

The desire for a water dilutable or water soluble epoxy resin system has existed since shortly after the first introduction of epoxy resins themselves. Although epoxy resins were introduced twenty-five years ago and have been commercially available for approximately twenty years, all attempts at water systems have met with general failure. The investigation into epoxy water systems has been roughly divided into three general classifications.

The first attempts, still continuing, involved emulsification of the epoxy resins themselves. However, the polarity of the epoxy resins makes the choice of surfactant or emulsifying agent very limited and difficult. Poor compatibility of the epoxy resin with protective colloids created problems. All surfactants, emulsifying agents and compatible protective colloids promoted hydrolysis of the epoxy groups in water systems. Such an approach results in poor emulsion stability and poor freeze-thaw stability at best, as well as phase inversion with all curing agents, and poor pigment stability.

The second approach to water systems was the development and investigation of water soluble epoxy systems. However, all known water soluble epoxy resins are aliphatic polyepoxides which exhibit little or none of the resistant properties normally expected of the epoxy resins; all water soluble epoxy resins hydrolyze in water, and reaction, if at all, with curing agents is slow, generally requiring heat, and such systems still exhibit the shortcomings encountered in emulsification of the epoxy resin itself.

The third approach was the emulsification of epoxy esters. This is very easily accomplished, but is generally limited to esters containing 50% or more fatty acid and even these contain some solvent because of the ester viscosity. This approach is a compromise resulting in a coating system with properties somewhat better than similar alkyd systems, but by no means better than those of an unmodified epoxy system.

Because of the generally bad to poor results from past attempts to produce water soluble epoxy resin systems it occurred to me to take an entirely new and different approach to the creation of a water dilutable epoxy system which would satisfy the following sought-after requirements of a water dilutable epoxy system, i.e.: (1) emulsion stability and water dilutability from the time of mixing the resin and curing agent until gelation; (2) pot life equivalent or nearly equivalent to a non-water system; (3) good pigment stability; (4) good freeze-thaw stability; (5) cure equivalent to a non-water system; (6) film properties equivalent or nearly equivalent to a non-water system; and (7) the highest resin content possible (for economic reasons, one does not want to pay for water).

SUMMARY OF THE INVENTION

In accordance with my invention I provide in one embodiment novel curing agents which combine the characteristics of an emulsifying agent, a wetting agent, and a surfactant in addition to their curing properties. My curing agents produce excellent emulsions upon mixing with conventional epoxy resins, with or without reactive diluents. The preparation of such emulsions also comprises an embodiment of my invention. The novel resultant emulsions comprise a further embodiment.

A primary or secondary amine is reacted with an aliphatic polyglycidyl ether to form complex amine products which constitute the combined emulsifying and curing agents of my invention. The aliphatic polyglycidyl ethers are represented by the following formula:

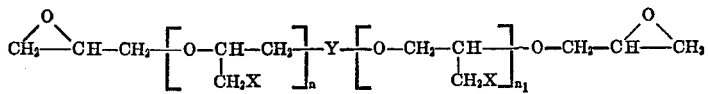

wherein X is chloro, bromo or iodo; Y is the residue from a saturated or unsaturated polyol having the structure OR'', wherein R'' is a saturated or olefinic hydrocarbon chain containing from about 2 to 14 carbon atoms, hydrogen and/or halogen atoms, preferably chlorine, bromine or iodine. This hydrocarbon residue can be linear or branched in structure and can contain cyclic, saturated or unsaturated rings as long as each terminal carbon is aliphatic. R'' may also be a polyglycol residue selected from the following structures;

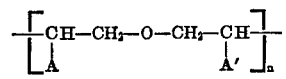

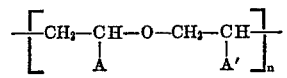

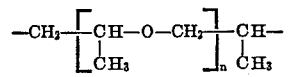

wherein A and A' may be the same or different and are hydrogen, a saturated or olefinic hydrocarbon of from 1 to 6 carbon atoms. The hydrocarbon structure may be linear or branched. In all formulas above $n$ and $n_1$ are the same or different whole integers of from 0 to 12.

The amine used may be represented by the simplified formula:

II wherein R is (1) a substituted or unsubstituted, aliphatic or olefinic hydrocarbon radical generally containing from about 2 to about 10 (and preferably 2–6) carbons and wherein in addition to hydrogen the substituents can be hydroxy or amino (i.e., $NR_2$ wherein R is hdrogen or alkyl containing from about 1 to about 6 carbons); (2) substituted or unsubstituted amino where the substituents can be hydrogen, alkyl or cycloalkyl (preferably 1–10 carbons), or acetyl; and (3) heterocyclo aliphatic moieties, where the hetero atom preferably is nitrogen, containing from about 5 to about 8 ring atoms. Illustrative of the radical R are hydroxy ethyl, amino ethyl, amino propyl, butyl amino, hexyl amino, acetyl amino, polyamino ethyl, polypropyl amino, ethyl, propyl, butyl, isobutyl, tertiary butyl, pentyl, isopropyl, hexyl, heptyl, octyl, nonyl decyl, aminoethylpiperazino, and the like. R' is hydrogen, alkyl (preferably 1–6 carbons) which can be substituted with hydroxy or amino (as defined above) groups. Exemplary of R' are methyl, ethyl, hydroxy ethyl, amino ethyl, propyl, hydroxy propyl, amino propyl, butyl, sec-butyl, pentyl, hexyl, and the like.

The novel curing agents of my invention are represented by the following formula:

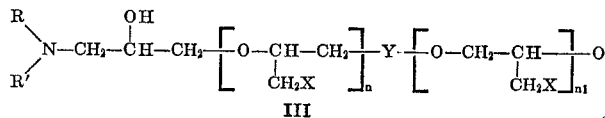

III wherein R, R' X, Y, $n$ and $n_1$ are as defined above, and containing at least two reactive hydrogen atoms (i.e., at least two of R or R' are hydrogen or contain a hydrogen bonded to nitrogen). The molecule of Formula III can be further substituted at the carbon bonded hydrogens with alkyl (preferably lower-alkyl, i.e., 1–6 carbons), aryl (preferably phenyl), cycloaliphatic (preferably containing 5–7 carbons), heterocycloaliphatic (as defined above) and the like organic groups.

Illustrative of the preparation of the curing agents of my invention is the following which is a preferred embodiment wherein Q is 2 or greater and $n$ and $n_1$ are 0 to 12.

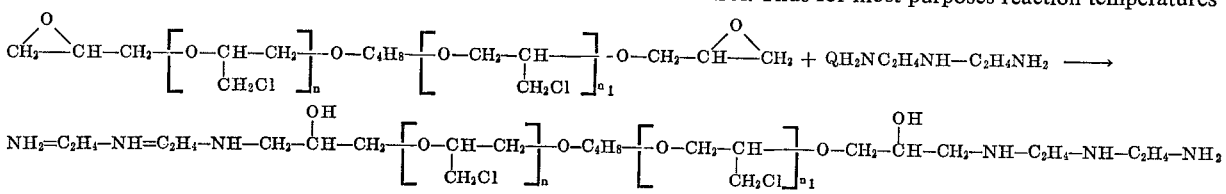

In the preparation of the desired curing agents of this invention by reaction of polyglycidyl ether with amine an excess of amino hydrogen must be present. In general these reactants are reacted in molar ratios ranging from about 2:1 to about 6:1 and preferably no higher than about 4:1 of amine to polyglycidyl ether. Ratios higher than 6:1 can be employed, but are uneconomical. Reaction temperatures which favor the formation of the desired product III and not undesirable side reactions, e.g., 25° C. to 80° C. are employed. With halide-free polyglycidyl ethers the desired reaction can be conducted over a wider temperature range, e.g., 25° C. to 95° C.

The curing agents of this invention produce excellent emulsions upon addition to conventional epoxy resins, with or without reactive diluents, to silicone containing epoxy resins, or to fire retardant epoxy resins. Such epoxy resins generally have a molecular weight of from about 300 to about 10,000 and are fully described in "Handbook of Epoxy Resins" Lee and Neville, McGraw-Hill, Inc., New York, (1967), pp. 2-4 through 2-12, for example.

These are true emulsions which exhibit similar gel rates regardless of dilution. The resulting films from these emulsions exhibit excellent flexibility, gloss resistance and other properties remarkably similar to non-aqueous systems.

DETAILED DESCRIPTION OF THE INVENTION

The curing agents of my invention contain one or more of the following linkages: aliphatic ether groups, primary and/or secondary hydroxyl groups, and primary, secondary and tertiary amino nitrogen groups. These curing agents are reaction products of amines, preferably, diamines, with the diglycidyl ethers of polyglycols and diols evidencing surface-active properties.

Exemplary of the diglycidyl ethers are bis-phenol diglycidyl ether resins modified with mono epoxide diluents (cresyl glycidyl ether and butyl glycidyl ether), a bis-phenol diglycidyl ether resin modified with an aliphatic diglycidyl ether and an aliphatic substituted phenol, a poly glycidyl ether of poly propylene glycol; the diglycidyl ethers of 1,4-butane diol, propylene glycol, dipropylene glycol, polyethylene glycol (molecular weight 400), polyethylene glycol (molecular weight 600), diethylene glycol, and 1,6-hexane diol. The foregoing are not intended to be limiting since virtually any polyhydric alcohol or glycol diglycidyl ether may be employed in preparing the curing agents of my invention so long as the resultant curing agent is compatible with the specific epoxy resin to be emulsified. Compatibility can be designed by blending epoxy resins, adding diluents, either reactive or non-reactive, or by the addition of coupling agents or modifying resins. These variations are well known and are fully discussed in "Handbook of Epoxy Resins" (supra).

Exemplary of the preferred amines which can be employed are triethylenetetramine, tetraethylenepentamine, ethylenediamine, pentaethylenehexamine, and the like amines of the general formula set forth above.

The curing agent can be produced over a reaction temperature ranging upwards from about 25° C. Although the reaction can be conducted at temperatures in excess of 95° C., this appears for most purposes to be an upper practical limit since above this temperature the reaction becomes extremely rapid and requires special techniques for control. Thus for most purposes reaction temperatures ranging between 25° C. and 95° C. are employed and temperatures ranging from about 30° C. to about 85° C. are preferred.

The following examples further demonstrate my invention.

EXAMPLE 1

The polyglycidyl ether of polypropylene glycol was prepared by reacting one mole (400 gms.) of polypropylene glycol, molecular weight 425, with four moles (370 gms.) epichlorohydrin in the presence of stannic chloride (20 gms.). The glycol and stannic chloride were premixed and heated to 60° C. The epichlorohydrin was added slowly with cooling to maintain a reaction temperature of 55–65° C. (30–60 minutes addition time). The reaction mixture was maintained at 55–65° C. for an additional thirty minutes, at which time all of the epichlorohydrin had been consumed. The reaction mixture was cooled to 35° C. and two moles of sodium hydroxide (80 gms.) were added as an aqueous 50% solution over a period of one hour and at a reaction temperature of 35 to 45° C. The reaction mixture was held an additional thirty minutes after which water (380 gms.) was added and the brine layer allowed to separate. After separation, the organic layer was analyzed for hydrolyzable chlorine and sufficient sodium hydroxide was added to the reaction mixture at 35° C. to reduce the final hydrolyzable chlorine content to less than 0.1%. After holding one hour after the sodium hydroxide addition, the reaction mixture was freed of salt and unreacted sodium hydroxide by repeated water washing. The organic layer was freed of water by distillation under reduced pressure to a final temperature of 120° C. at 50 mm. of mercury. The filtered residue (product) was a clear water white liquid having a weight per epoxide of 361 and a hydrolyzable chlorine content of 0.08%. This product contains two bound chlorine groups and is predominately the diglycidyl ether with little or no monoglycidyl ether. For simplicity, this product will be called 400 PGE in further examples.

EXAMPLE 2

250 gms. (2.4 moles) diethylene triamine were weighed into a reaction flask equipped with an agitator, thermometer, condenser and dropping funnel and heated to 60° C. 722 gms. (1 mole) 400 PGE were added dropwise. The reaction was maintained at 60–65° C., cooling as needed. The addition was complete after 2 hours and the reaction mixture was held an additional 2 hours to insure completeness of the reaction. During the reaction period there was gradual increase in viscosity and a slight change in color from water white to light straw. The product, after holding, was soluble in water. For ease in handling, 524 gms. of water were added. The resulting solution had a pH of 10.6 and a theoretical weight per amino hydrogen of 187. The above solution was added in stoichiometric amounts (50 gms.) to a bisphenol diglycidyl ether resin having a weight per epoxide of 189 (50 gms.). An immediate water in oil emulsion was formed on mixing. Further small additions of water effected the desired inversion, with easy mixing, at which point the resulting oil in water emulsion could be further diluted with water without separation. The resulting emulsion had a pot life of 2 hours and was stable until gelation occurred. A film of the emulsion cast on tin plate, 1–2 mils thick, had excellent leveling and good flow. Water release was relatively fast (30–40 minutes) producing a clear, high gloss film. The film was set to touch in 3 hours and tack free in 6–7 hours.

Similar emulsions were prepared using bisphenol diglycidyl ether resins modified with monoepoxide diluents (cresyl glycidyl ether and butyl glycidyl ether). An excellent emulsion was obtained using bisphenol diglycidyl ether resin modified with an aliphatic diglycidyl ether and an aliphatic substituted phenol. The latter also exhibited excellent leveling and excellent flow with approximately 30% faster dry. After 24 hours all films tested had outstanding flexibility.

EXAMPLE 3

Triethylene tetramine 352 gms. (2.4 moles) of triethylene tetramine were reacted with 722 gms. (1 mole) 400 PGE under the same conditions as the initial screening condensation. 563 gms. of water were used and the resulting solution had a pH of 10.4 and a weight per amino hydrogen of 132. When 36 gms. of this solution were added to 50 gms. of a modified bisphenol diglycidyl ether resin, an excellent emulsion resulted on inversion which exhibited excellent film properties and an emulsion pot life of 50–60 minutes.

EXAMPLE 4

Ethylene diamine 144 gms. (2.4 moles) ethylene diamine were reacted with 722 gms. 400 PGE under the same conditions as A. 466 gms. of water were added. The resulting solution had a pH of 10.8 and a weight per amino hydrogen of 175. An excellent emulsion was obtained using either modified or unmodified bisphenol diglycidyl ether resins which on inversion were water dilutable and exhibited good film properties. The emulsion pot life was between 40 and 120 minutes depending on the epoxy resin used. The rate of dry was slower than the diethylene triamine or triethylene tetramine products.

Diethylene triamine was also reacted with the diglycidyl ether of 1,4-butanediol, propylene glycol, dipropylene glycol, polyethylene glycol (molecular weight 400), polyethylene glycol (molecular weight 600), diethylene glycol, and 1,6-hexanediol. In all cases, the hydrolyzable chlorine was less than 0.1% and 2.4 moles of diethylene triamine were reacted with 1 mole of the diglycidyl ether, based on weight per epoxide. The reactions were run at 60–65° C. All of these complex amino compounds produced emulsions which in turn produced fair to excellent films. Those films that were classed as fair exhibited somewhat slower water release and some evidence of crawling on tin plate. This was particularly true of the compounds based on diglycidyl ethers of less than 300 molecular weight. Addition of additives corrects this problem as will be discussed fully hereinafter.

EXAMPLE 5

250 gms. (2.4 moles) of diethylenetriamine was heated to the desired reaction temperature (50–55° C.) and 722 gms. (1 mole) 400 PGE was added dropwise. The temperature was maintained at 50–55° C. with cooling as needed. The addition was complete in 2 hours. The reaction mixture was held at 50–55° C. an additional 2 hours at which time 524 gms. of water were added and the solution discharged. The product produced an excellent emulsion with a modified bisphenol diglycidyl ether resin. The pot life was approximately 2 hours and the emulsion film properties were excellent as to gloss, flow and flexibility.

EXAMPLE 6

The same conditions as Example 5 were used except that a reaction temperature of 40–45° C. was employed. The resulting product formed an excellent emulsion with a modified bisphenol diglycidyl ether resin. The emulsion had a pot life of 2½ hours and produced films with excellent properties.

EXAMPLE 7

The same conditions as Example 5 were used with a reaction temperature of 30–35° C. The addition time was 4–5 hours. The reaction was held an additional 2 hours before dilution and discharge. The product formed an excellent emulsion with a modified bisphenol diglycidyl ether resin. The emulsion had a pot life of 3 hours and produced films which had excellent flow gloss and flexibility.

EXAMPLE 8

The same conditions as Example 6 were used with a reaction temperature of 70–75° C. The addition required 1½ hours. The resulting product was slightly darker in color, but produced an excellent emulsion with a modified bisphenol diglycidyl ether resin. The emulsion pot life was 1 hour. The film properties were excellent and dried somewhat faster than Example 6.

EXAMPLE 9

The same reaction conditions as Example 6 were used at a reaction temperature of 80–85° C. The addition required 1 hour. The product was darker than Example 8, and was slightly hazy while hot after the water addition. The product when cool was clear, but more viscous than the previous examples. The product formed an excellent emulsion with a modified bisphenol diglycidyl ether resin. The emulsion had a pot life of 20 to 30 minutes. The film properties were excellent and dried about 50% faster than Example 6.

EXAMPLE 10

The same conditions as Example 6 were used with an addition temperature of 90–95° C. The addition time was 1 hour. The product became extremely viscous and could not be reduced with water easily. The product still formed an excellent emulsion with a modified bisphenol diglycidyl ether. The emulsion had a pot life of 15 minutes. The film properties were good as to flow and leveling, but heavier film thickness resulted in a slight haze due to water retention caused by a more rapid dry.

EXAMPLE 11

The same conditions as Example 6 were used with a reaction temperature of 100–105° C. The product became extremely viscous after 60% of the 400 PGE was added. Further addition resulted in poor mixing and an unusable product. Similar results were obtained at both 110° C. and 120° C.

EXAMPLE 12

The same reaction conditions as Example 6 were used with an addition temperature of 25° C. The addition time was 9 hours. In addition, the product was held an additional 9 hours before the water was added. The product formed an excellent emulsion with a modified bisphenol diglycidyl ether resin. The emulsion had a pot life of 3½ hours and produced films with excellent properties.

EXAMPLE 13

In this example 268 gms. (1 mole) of butanediol diglycidyl ether having a molecular weight of approximately 260–270 was added dropwise to 250 gms. (2.4 moles) diethylene triamine at the temperatures listed in the table below. The reaction mixture was held for 2 hours at the reaction temperature after the addition was complete, with the exception of 25° C. in which case the mixture was held 9 hours after the addition. The results are summarized below:

| Reaction temperature, ° C. | Reaction time, hours. | Product at 65% in water | Emulsion | Pot life | Film |
|---|---|---|---|---|---|
| 20–25 | 9 | Clear | Good | 5½ hrs | Good. |
| 30–35 | 5½ | do | do | 4½ hrs | Do. |
| 50–55 | 2 | do | do | 2 hrs | Do. |
| 60–65 | 2 | do | do | 1½ hrs | Do. |
| 70–65 | 1½ | do | do | 30–40 min | Do. |
| 80–85 | 1 | do | do | 30 min | Do. |
| 90–95 | 1 | (¹) | do | 20 min | Fair. |

¹ Clear, but very viscous.

The results of addition of amine leveling agents such as dimethyl ethanol amine, during the preparation of the curing agents of my invention are set forth in the following Examples 14 to 25 wherein butanediol diglycidyl ether (molecular weight 268) was reacted with various amines after which dimethyl ethanol amine was added.

EXAMPLE 14

220 gms. (2.13 moles) of diethylene triamine was heated to 50–55° C. and 268 gms. of butanediol diglycidyl ether having a molecular weight of approximately 260–270 was added dropwise in 2 hours. The reaction mixture was held 2 hours at 50–55° C. and 36 gms. of dimethyl ethanol amine was added. The product had a weight per amino hydrogen of 65.5 and when diluted to 65% solids with water, formed an excellent emulsion with a modified conventional epoxy resin and produced films which had excellent flow.

EXAMPLE 15

380 gms. (2.01 moles) of tetraethylene pentamine were reacted under the same conditions as Example 14 above. After the hold period, 36 gms. of dimethyl ethanol amine were added. The product had a weight per amino hydrogen of 57. When diluted to 65% solids with water, the product formed an excellent emulsion with a modified conventional epoxy resin and produced films which had excellent flow.

EXAMPLE 16

240 gms. (2.1 moles) of 1,6-hexanediamine were reacted under the same conditions as Example 14 above. After the hold period, 36 gms. of dimethyl ethanol amine were added. The product had a weight per amino hydrogen of 91. The product when reduced to 65% solids with water formed an excellent emulsion with conventional modified epoxy resins. These emulsions had a short pot life (15 minutes) but formed films with good flow. Heavy films were hazy due to the fast cure causing water entrapment.

EXAMPLE 17

210 gms. (2.01 moles) of amino ethyl amino ethanol were reacted under the same conditions as Example 14 above. After the hold period, 36 gms. of dimethyl ethanol amine were added. The product has a weight per amino hydrogen of 128. The product formed an excellent emulsion with conventional epoxy resins. These emulsions formed films with excellent flow. The rate of cure of these films was somewhat slow at room temperature (10–12 hours). Cure at 100° F. was good at 2 hours.

EXAMPLE 18

130 gms. (2.17 moles) of ethylene diamine were reacted under the same conditions as Example 14 above. After the hold period, 36 gms. of dimethyl ethanol amine were added. The crystalline product had a weight per amino hydrogen of 72. Excellent emulsions were obtained when the product, diluted to 80% solids with water, was added to conventional epoxy resins. Films prepared from these emulsions had good flow, but cured slowly (10–12 hours) at room temperature, but cured in 2 hours at 100–120° F.

EXAMPLE 19

300 gms. (2.06 moles) of triethylene tetramine were reacted under the same conditions as Example 14 above. After the hold period, 36 gms. of dimethyl ethanol amine were added. The product had a weight per amino hydrogen of 60. The product when reduced to 65% solids with water formed excellent emulsions with conventional epoxy resins. The resulting films had excellent flow and cure.

EXAMPLE 20

260 gms. (2.01 moles) of amino ethyl piperazine were reacted under the same conditions as Example 14 above. After the hold period, 36 gms. of dimethyl ethanol amine were added. The product had a weight per amino hydrogen of 141. The product, when diluted to 65% solids, formed excellent emulsions with conventional epoxy resins. The resulting films had excellent flow and cure.

EXAMPLE 21

125 gms. (2.05 moles) of mono ethanol amine were reacted under the same conditions as Example 14 above. After the hold period, 36 gms. of dimethyl ethanol amine were added. The resulting product has a weight per amino hydrogen of 214. The product formed excellent emulsions with good film flow when added to conventional epoxy resins as an 80% solution in water. These films required elevated temperature cures (120 to 150° F.).

EXAMPLE 22

350 gms. (2.06 moles) of methane diamine were reacted under the same conditions as Example 14 above except that the reaction period was extended to 10 hours and the hold period to 6 hours due to the slow rate of reaction. After the hold period, 36 gms. of dimethyl ethanol amine were added. The product had a weight per amino hydrogen of 109. When reduced to 80% solids with water, the product formed good emulsions with conventional epoxy resins which formed films with good flow and cure.

EXAMPLE 23

270 gms. (2.1 moles) of diethyl amino propyl amine were reacted under the same conditions as Example 14 above. After the hold period, 36 gms. of dimethyl ethanol amine were added. The product had a weight per amino hydrogen of 287. The product, when reduced to 75% with water formed excellent emulsions with conventional epoxy resins. These films had excellent flow but required elevated temperature cures (120–150° F.).

EXAMPLE 24

125 gms. (1.20 moles) of amino ethyl ethanol amine and 125 gms. (1.20 moles) of diethylene triamine were reacted under the same conditions as Example 14 above. After the hold period, 36 gms. of dimethyl ethanol amine were added. The product had a weight per amino hydrogen of 73. When reduced to 65% solids with water, the product formed excellent emulsions with conventional epoxy resins. The resutling films had excellent flow and cure but were hazy.

All of the above Examples 14–24 were repeated without the dimethyl ethanol amine leveling agent. In all cases, the emulsions formed were of identical quality. The films formed in some cases were markedly improved when dimethyl ethanol amine was used. In none of these examples was the amine additive detrimental either to flow or cure. The choice of its use would depend largely upon the starting amine and aliphatic polyglycidyl ether used.

It is also interesting to note that although some products require elevated temperatures to cure, they are very moderate, and further, some amines which normally do not cure at room temperature or even low temperatures in thin films, result in products which cure either at room temperature or just slightly elevated temperatures.

Examples 14–24 were run with dimethyl ethanol amine added to the product after the reaction. The following examples were run using the same general conditions, but with the dimethyl ethanol added at the beginning of the reaction.

EXAMPLE 25

220 gms. (2.13 moles) of diethylene triamine and 36 gms. of dimethyl ethanol amine were heated to 50 to 55° C. 268 gms. (1.0 moles) of butanediol diglycidyl ether having a molecular weight of approximately 260–270 was added dropwise in 2 hours. The reaction mixture was held an additional 2 hours at 50 to 55° C. The product had a weight per amino hydrogen of 65.5 and when diluted to 65% solids with water, formed an excellent emulsion with conventional epoxy resins. The films prepared from these emulsions had excellent flow and cure.

In all of these determinations, the results were the same regardless of whether the dimethyl ethanol amine is added with the starting amine or to the final product.

The following examples show the effect of substituted phenols to improve flow as well as to improve cure. Nonyl phenol was used as the substituted phenol. Both 400 PGE and butanediol diglycidyl ether were used with diethylene triamine as the amine.

EXAMPLE 26

220 gms. (2.13 moles) of diethylene triamine were heated to 50 to 55° C. 268 gms. of butanediol diglycidyl ether having a molecular weight of approximately 260–270 were added dropwise over a 2 hour period. The reaction mixture was held an additional 2 hours at 50 to 55° C. and 60 gms. of nonyl phenol was added. The product had a weight per amino hydrogen of 63 and, when diluted to 65% solids with water, formed excellent emulsions with conventional epoxy resins. The resulting films had excellent flow. The pot life of the emulsion and the cure of the film were not noticeably altered by the addition of nonyl phenol.

EXAMPLE 27

The above determination was repeated using the same conditions except 722 gms. 400 PGE was used. The product when diluted to 65% solid with water formed excellent emulsions with conventional epoxy resins. The resulting films had excellent flow. The pot life and the cure of the film were not noticeably altered by the addition of nonyl phenol.

The effect of nonyl phenol is quite similar to dimethyl ethanol amine in that it is effective with certain complex amine systems, but is not detrimental to any of the emulsions systems.

EXAMPLE 28

Following the procedure of Example 26, dimethyl ethanol amine and nonyl phenol were reacted with butanediol diglycidyl ether and diethylene triamine. After the hold period, 36 gms. of dimethyl ethanol amine and 60 gms. of nonyl phenol were added. The product, when reduced to 65% solids with water, formed excellent emulsions with conventional epoxy resins. The films had excellent flow and cured slightly faster than those not containing dimethyl ethanol amine and nonyl phenol. The pot life was also shorter by 10%.

Thus, it is evident that the combination of tertiary amine and substituted phenol can be used to effect a slightly faster cure. Again in some systems, the flow was improved and in none of the systems studied was it detrimental.

In all previous examples the reaction of the various amines and aliphatic polyglycidyl ether was conducted under substantially anhydrous conditions. The resulting products were then reduced with water. In the following examples water was used during the reaction.

EXAMPLE 29

250 gms. (2.4 moles) of diethylene triamine and 280 gms. of water were premixed and heated to 60° C. 268 gms. (1 mole) butanediol diglycidyl ether having a molecular weight of approximately 260–270 were added dropwise over a 2 hour period, cooling as needed. The reaction was held an additional 2 hours at 60 to 65° C. The resulting product had a weight per amino hydrogen of 80. The produce formed a good emulsion with conventional epoxy resins. The resulting films cured satisfactorily, but had poor flow and wetting.

EXAMPLE 30

400 gms. (2.4 moles) of tetraethylene pentamine and 360 gms. of water were premixed and reacted under the same conditions as Example 29 above. The resulting product had a weight per amino hydrogen of 80. The product formed a good emulsion with conventional epoxy resins with good cure, but poor flow and wetting in thin films.

EXAMPLE 31

250 gms. (2.4 moles) of diethylene triamine and 524 gms. of water were premixed and reacted with 722 gms. of 400 PGE under the same conditions as Example 29 above. The resulting product was seedy and separated.

EXAMPLE 32

The same conditions as Example 31 above were repeated, but using 100 gms. of water. The resulting product was very turbid and on standing separated.

It is apparent that although water may be used in the condensation with some polyglycidyl ethers, it cannot be used in all cases.

In a further study on the effect of water, varying amounts of water were added to the anhydrous products and the resulting solutions were checked for ease of emulsification.

All anhydrous epoxy resins, except those that crystallize, form emulsions upon treatment with my curing agents. However, mixing is difficult and the water must be added very slowly until the inversion point is reached. This normally occurs at a water to resin ratio of 35 to 50 parts of water per 100 parts of conventional epoxy resin. The best emulsion from the standpoint of mixing, dilution and ease of formation occurs when the products contain 20 to 40% by weight water prior to mixing and have a viscosity of 300 to 10,000 cps. These are the most desired levels although this is not limiting. Products containing water greatly in excess of that water necessary to reach the inversion point form poor emulsions or inverse emulsions (water in oil). Product solutions of very low viscosity (100 to 1,000 cps.) generally form emulsions difficultly and may be unstable, exhibiting separation prior to gelation.

EXAMPLE 33

The complex amine prepared from diethylene triamine and polyglycidyl ether 400 PGE was used to emulsify and cure a fire retardant resin prepared by blending a conventional bisphenol-A diglycidyl ether with the diglycidyl ether of tetrabromobisphenol-A in equal amounts. The emulsion was excellent and films prepared from the emulsion were excellent as to cure.

EXAMPLE 34

A silicone epoxy resin was prepared by reacting a conventional silicone intermediated with an epoxy resin containing 1.6 equivalents per kilogram of hydroxyl groups (Resypox 1634, a bisphenol diglycidyl ether having a molecular weight of approximately 500) as follows:

Charge 625 gms. Resypox 1634 and 257 gms. 6188 (Dow Corning), a silicone resin having a molecular weight of approximately 750, to a flask equipped with a thermometer, agitator, condenser and vacuum take-off. The mixture was heated to 70° C. and the agitator started. Heating was continued to 180° C. at full vacuum (50 mm. mercury) and held for 3 hours. The reaction product was cooled to 100° C. and 350 gms. of butanediol diglycidyl ether was added. The mixture was reheated to 180° C. and held for 2 hours under vacuum (50 mm. mercury). The product was allowed to cool to room temperature and 5 parts per hundred of nonyl phenol were added. The product had an epoxy value of 3.9 equivalents per kilogram. This product was emulsified using the complex amine prepared from diethylene triamine and 400 PGE. The resulting emulsion was excellent. Films prepared from this emulsion had excellent flow and cure and in addition, exhibited good water repellency.

EXAMPLE 35

The diglycidyl ether of dibromobutanediol having a molecular weight per epoxide of 200 was prepared in the conventional manner by reacting with epichlorohydrin and stannic chloride followed by dehydrohalogenation with caustic and purification. This product was blended with a conventional epoxy resin in equal amounts. The blend had a weight per epoxy of 256. This blend was emulsified with the complex amine used in Example 34 above. The emulsion was excellent as were films prepared from the emulsion.

EXAMPLE 36

One mole of the diglycidyl ether of Example 35 was reacted with 2.4 moles of diethylene triamine at 50 to 55° C. as per Example 26 above, except that the amount of water was reduced to 350 gms. The resulting product formed excellent emulsions with conventional epoxy resins. Films prepared from these emulsions had good flow and cure.

What is claimed is:

1. A method for emulsifying and curing an epoxy resin which comprises contacting with said resin in a water system a compound of the formula

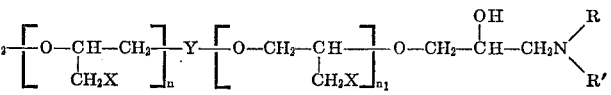

wherein R is (1) a hydrocarbon radical containing from about 2 to about 10 carbons and wherein in addition to hydrogen the substituents can be hydroxy or amino; (2) amino where the substituents are hydrogen, alkyl or cycloalkyl containing from about 1 to about 10 carbons, or acetyl; or (3) heterocycloaliphatic moieties, where the hetero atom is nitrogen, containing from about 5 to about 8 ring atoms; R' is hydrogen, alkyl containing from about 1 to about 6 carbons which can be substituted with hydroxy or amino; X is chloro, bromo or fluoro; Y has the structure OR" as being the residue from a saturated or unsaturated polyol in which each terminal carbon of R" is aliphatic; and $n$ and $n_1$ are the same or different integers from 0–12; said compound containing at least two reactive hydrogens.

2. The method of claim 1 wherein R is hydroxy ethyl, amino ethyl, amino propyl, butyl amino, hexyl amino, acetyl amino, polyamino ethyl, polypropyl amino, ethyl, propyl, butyl, isobutyl, tertiary butyl, pentyl, isopropyl, hexyl, heptyl, octyl, nonyl, decyl or aminoethyl piperazino.

3. The method of claim 1 wherein R' is methyl, ethyl, hydroxy ethyl, amino ethyl, propyl, hydroxy propyl, amino propyl, butyl, sec-butyl, pentyl or hexyl.

4. The method of claim 1 wherein R is hydroxy ethyl, amino ethyl, amino propyl, butyl amino, hexyl amino, acetyl amino, polyamino ethyl, polypropyl amino, ethyl, propyl, butyl, isobutyl, tertiaryl butyl, pentyl, isopropyl, hexyl, heptyl, octyl, nonyl, decyl or aminoethylpiperazino, and R' is methyl, ethyl, hydroxy ethyl, amino ethyl, propyl, hydroxy propyl, amino propyl, butyl, sec-butyl, pentyl or hexyl.

5. The method of claim 1 wherein X is chloro.

6. The method of claim 4 wherein X is chloro.

7. The method of claim 8 wherein said compound is substituted at a carbon bonded hydrogen with lower-alkyl, aryl, a cycloaliphatic group containing from about 5 to about 7 carbons or a heterocycloaliphatic group containing from about 5 to about 8 ring atoms.

8. The method of claim 1 wherein said compound has the formula

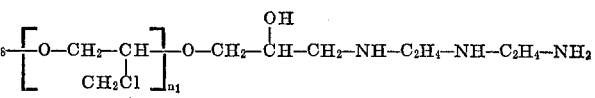

wherein $n$ and $n_1$ are the same or different integers from 0–12.

References Cited
UNITED STATES PATENTS 2,921,050   1/1960   Belanger _____ 260—47
3,108,011  10/1963   Frotscher _____ 260—2

WILLIAM H. SHORT, Primary Examiner

R. E. PERTILLA, Assistant Examiner

U.S. Cl. X.R.

260—29.2 EP, 47 EN, 830 TW

UNITED STATES PATENT OFFICE
CERTIFICATE OF CORRECTION

Patent No. 3,758,421  Dated September 11, 1973

Inventor(s) Otho Leroy Nikles, Jr.

It is certified that error appears in the above-identified patent and that said Letters Patent are hereby corrected as shown below:

Column 1, lower left substituent in formula should read --R'--

Column 3, line 11, "hdrogen" should read --hydrogen--

Column 3, line 24, "hydroxy or amino) as defined above)" should read --hydroxy or amino (as defined above)--

Column 3, third formula, "$QH_2NC_2H_4NH$" should read --$Q\ H_2NC_2H_4NH$--

Column 3, last formula, substitute dashes (-) for equal signs (=)

Column 11, line 7, "300" should read --3000--

Column 12, line 42, "tertiaryl" should read --tertiary--

Signed and sealed this 26th day of February 1974.

(SEAL)
Attest:

EDWARD M. FLETCHER, JR.
Attesting Officer

C. MARSHALL DANN
Commissioner of Patents